(12) United States Patent
Reinhart et al.

(10) Patent No.: US 6,527,094 B2
(45) Date of Patent: Mar. 4, 2003

(54) FREEWHEEL ARRANGEMENT, IN PARTICULAR FOR A GUIDE WHEEL OF A HYDRODYNAMIC TORQUE CONVERTER

(75) Inventors: Edgar Reinhart, Hofheim (DE); Dietrich Bechmann, Röthlein (DE); André Meyer, Schweinfurt (DE); Friedrich Schramm, Schonungen-Forst (DE); Christoph Sasse, Schweinfurt (DE); Erwin Wack, Niederwerrn (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/827,405

(22) Filed: Apr. 5, 2001

(65) Prior Publication Data

US 2001/0035322 A1 Nov. 1, 2001

(30) Foreign Application Priority Data

Apr. 10, 2000 (DE) .......................... 100 17 743

(51) Int. Cl.⁷ .................... F16D 41/12; F16D 33/00
(52) U.S. Cl. .................. 192/3.34; 192/46; 192/108; 60/345; 74/577 S
(58) Field of Search .................. 192/3.34, 46, 108; 60/345; 188/87.7; 74/577 R, 577 S

(56) References Cited

U.S. PATENT DOCUMENTS

| | | | | |
|---|---|---|---|---|
| 1,323,797 A | * | 12/1919 | Tomlinson | 192/46 X |
| 2,710,504 A | * | 6/1955 | Dodge | 60/345 |
| 5,070,978 A | | 12/1991 | Pires | 192/45.1 |
| 5,690,202 A | * | 11/1997 | Myers | 192/46 |
| 5,972,476 A | * | 10/1999 | Field | 428/174 |
| 5,983,757 A | * | 11/1999 | Blise et al. | 81/57.39 |

FOREIGN PATENT DOCUMENTS

JP 56-164232 A * 12/1981 .................. 192/46

\* cited by examiner

*Primary Examiner*—Richard M. Lorence
(74) *Attorney, Agent, or Firm*—Cohen, Pontani, Lieberman & Pavane

(57) ABSTRACT

A freewheel arrangement, in particular for a guide wheel of a hydrodynamic torque converter, permits a relative rotation between two elements in essentially only one relative rotational direction with respect to one another about an axis of rotation. At least one pawl is pivotably supported on a first of the two elements and has a pawl section which can come into contact with a blocking surface of the second of the two elements. At least one pawl is formed by a plurality of pawl plate elements which can be stamped from sheet metal.

11 Claims, 2 Drawing Sheets

FREEWHEEL ARRANGEMENT, IN PARTICULAR FOR A GUIDE WHEEL OF A HYDRODYNAMIC TORQUE CONVERTER

BACKGROUND OF THE INVENTION

1. Field of the Invention

The present invention relates to a freewheel arrangement, in particular for a guide wheel of a hydrodynamic torque converter, which freewheel arrangement essentially permits a relative rotation between two elements in only one relative rotational direction with respect to one another about an axis of rotation. At least one pawl is pivotably supported on a first of the two elements and has a pawl section which can come into contact with a blocking surface of the second of the two elements.

2. Description of the Related Art

Such a freewheel arrangement is known, for example, from U.S. Pat. No. 5,070,978. The known freewheel arrangement has a plurality of pawls, which are sequential to one another in the peripheral direction, which are pivotally supported on one of the elements and which, by means of their respective locking sections, engage radially outward for interaction with the other element. During the manufacture of such freewheel arrangements, the individual pawls must be manufactured with a high level of precision. In order to obtain the necessary torque transmission capacity in the blocking direction, furthermore, a plurality of pawls must, as already described, be provided sequentially to one another in the peripheral direction. This leads to a substantial expenditure of labor both in the process of manufacturing the individual pawls and in the process of assembly of such a freewheel arrangement.

SUMMARY OF THE INVENTION

The object of the present invention is to provide a freewheel arrangement with a favorable cost and easily manufactured design which achieves a high torque transmission capability in the locking direction.

According to the invention, this object is achieved by a freewheel arrangement, in particular for a guide wheel of a hydrodynamic torque converter, which freewheel arrangement essentially permits a relative rotation between two elements in only one relative rotational direction with respect to one another about an axis of rotation. At least one pawl is pivotably supported on a first of the two elements and has a pawl section which can come into contact with a blocking surface of the second of the two elements.

In this arrangement, provision is then additionally made for the at least one pawl to comprise a plurality of pawl plate elements.

The pawls are made up from a plurality of plate elements so that relatively thick pawls (viewed in the direction of their pivoting axis) are finally obtained which, as compared with conventional pawls formed from one body, provide a distinctly greater interaction surface for the interaction with a respective blocking surface. This, in turn, results in a reduction of the surface pressure with the result that the number of pawls to be employed to obtain the necessary torque transmission capacity can be distinctly reduced relative to the prior art.

As an example, the pawl plate elements can be sequentially arranged relative to one another in the direction of a pivoting axis about which the at least one pawl is pivotably supported on the first element. To further simplify the joining together of a freewheel arrangement according to the invention, the pawl plate elements are preferably permanently connected together. This can be done, for example, by bonding, welding or forming.

The individual pawl plate elements can, for example, be formed from sheet material, i.e. they can be manufactured by stamping techniques in a cost-favorable manner but still provide a very stable pawl configuration by a plurality of such elements being joined together.

The freewheel arrangement according to the invention preferably has a maximum of three pawls, most preferably only one single pawl.

In order to ensure that the pawl is always ready, uninfluenced by centrifugal force effect, for locking interaction with the associated blocking surface, a preloading element preloads the at least one pawl into a blocking position.

It is then possible for the preloading element to be elastically deformable and fixed on the first element, and for the preloading element to interact with the at least one pawl in a recess region formed between two pawl plate elements.

The present invention relates, furthermore, to a freewheel arrangement, in particular for a guide wheel of a hydrodynamic torque converter, which freewheel arrangement essentially permits a relative rotation between two elements in only one rotational direction with respect to one another about an axis of rotation. A single pawl is pivotably supported on a first of the two elements and has a pawl section which can come into contact with a blocking surface of the second of the two elements.

The present invention relates, furthermore, to a hydrodynamic torque converter, which has a freewheel arrangement according to the invention. A plurality of guide wheel vanes sequential to one another in the peripheral direction is supported on one of the two elements in a radially outer region and the other of the two elements is supported so as to be rotationally fixed relative to a support element.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
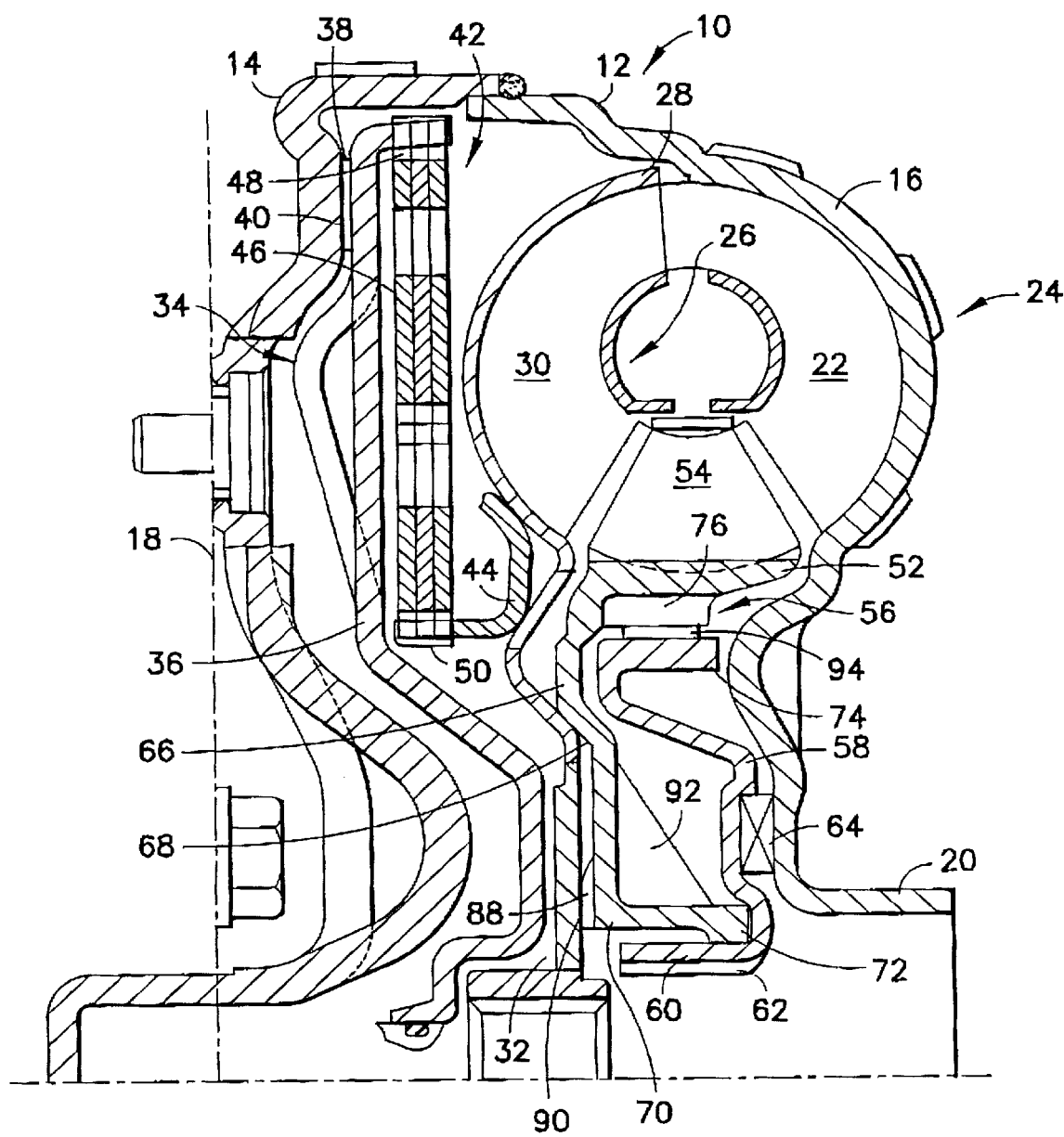
FIG. 1 shows a partial longitudinal section through a hydrodynamic torque converter.

Referring to FIG. 1, a hydrodynamic torque converter according to the invention includes a casing arrangement 12 which comprises, in turn, a casing cover 14 and a pump impeller shell 16 connected, in the radially outer region, by welding or the like to this casing cover 14. The casing cover 14 is, or can be, torsionally connected by means of a coupling arrangement 18 to a driving shaft (not shown) and the pump impeller shell 16 is integrally configured with a pump impeller hub 20 in its radially inner region. In its radially outer region, furthermore, the pump impeller shell 16 carries a plurality of pump impeller vanes 22. The pump impeller shell 16, together with the integral pump impeller hub 20 and the pump impeller vanes 22, form a pump impeller 24. A turbine wheel 26 provided in the internal space of the torque converter 10 includes a turbine wheel shell 28, which carries a plurality of turbine wheel vanes 30 in its radially outer region and which is permanently connected, in its radially inner region, to a turbine wheel hub 32. The turbine wheel hub 32 can be coupled for joint rotation to a driven shaft, for example a gearbox input shaft.

The hydrodynamic torque converter 10 includes a lock-up clutch arrangement 34 having a clutch piston 36 which, in its radially inner region, is guided so that it can move axially on the driven shaft (not shown). In its radially outer region, with the intermediary deposition of the frictional lining 38 or the like, the clutch piston 36 can be pressed against a mating friction surface 40 of the casing cover 14. In addition, the clutch piston 36 is permanently connected to the turbine wheel 26, or a drive element 44 attached to it, by means of a coupling arrangement 42 configured as a torsional vibration damper. The torsional vibration damper can, for example, have a spiral-type configuration of spring element or a spring element region 46 of this type, which is connected to the clutch piston 36 in a radially outer ring-type coupling region 48 and is connected to the drive element 44 in a radially inner ring-type coupling region 50.

A guide wheel 52 is located axially between the turbine wheel 26 and the pump impeller 24. On its radially outer region, the guide wheel 52 carries a plurality of guide wheel vanes 54 and is supported by means of a freewheel arrangement 56 on a support element (not shown), for example a support shaft, which extends for example coaxially with the pump impeller hub 20. The freewheel arrangement 56 ensures that the guide wheel 52, together with the guide wheel vanes 54 carried on it, can only be freely rotated in one rotational direction and is blocked against rotation in the other rotational direction.

In its radially inner section 60, which has an essentially cylindrical configuration, a freewheel inner element 58 has teeth 62 by means of which it can be torsionally coupled to the support element. Furthermore, the freewheel inner element 58 is axially supported in the pump impeller shell 16 by means of an axial bearing arrangement 64. An essentially cylindrical section 76 of the guide wheel 52, i.e. of a body region 66, is located opposite to a corresponding radially outer and essentially cylindrical section 74 of the freewheel inner element 58. This body region 66 essentially forms a freewheel outer element 68 which, together with a radially inwardly located and essentially cylindrical section 70, forms a bearing section 72, which is supported, both radially and axially, on the opposite surface region of the freewheel inner element 58. Furthermore, the freewheel outer element 68 is axially supported on the turbine wheel hub 32 by means of a sliding bearing section 88, which has a plurality of fluid passage ducts 90. The freewheel inner element 58 or/and the freewheel outer element 68 can be covered with a sliding bearing material so as to obtain an easy relative rotation capability between these two elements. The freewheel outer element 68 could also be manufactured from a material having a good sliding property. In order to stiffen the freewheel outer element 68, a plurality of rib elements 92, which is arranged sequentially in the peripheral direction, is arranged on this freewheel outer element 68.

Figure 2:
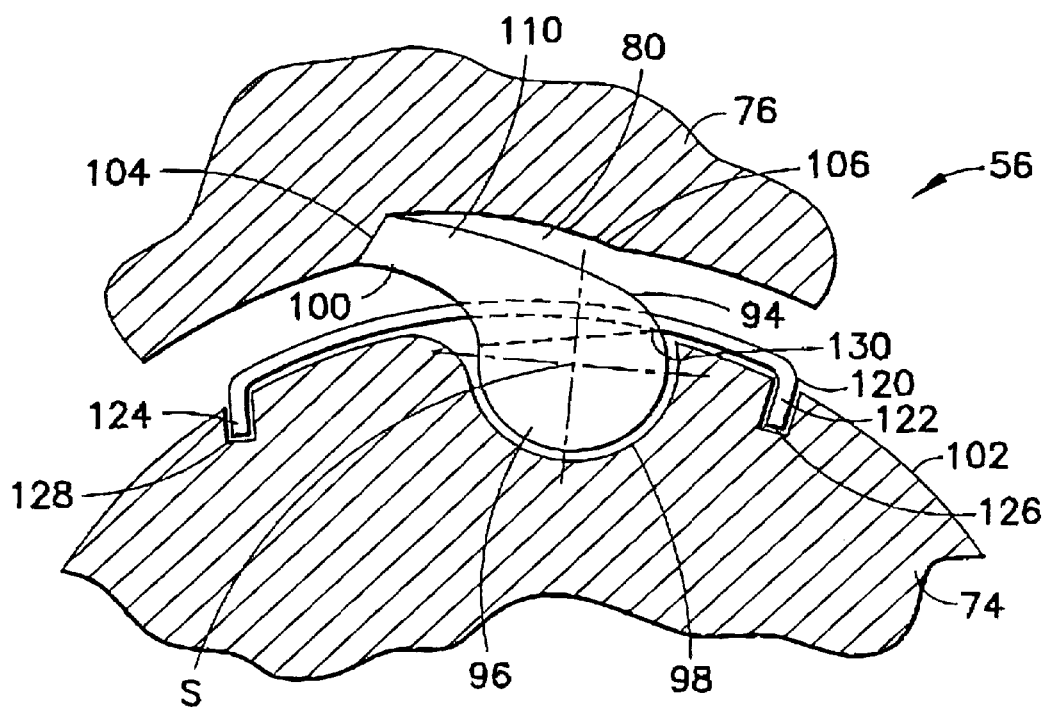
FIG. 2 shows a partial axial view in which the design of a freewheel arrangement according to the invention is represented.

As may be seen in FIG. 2, at least one, and preferably only one, pawl 94 is supported on the essentially cylindrical section 74 of the freewheel inner element 58. This pawl has a pawl body region 96 with an approximately circular profile, which is inserted into a correspondingly shaped recess 98 of the section 74. A locking section 100 of the pawl 94 protrudes beyond the outer peripheral surface 102 of the section 74. A depression 80, which ends with a blocking surface 104 directed approximately in the peripheral direction, is formed on the section 76. A transition region 106 gradually leads from the radially outer end region of the blocking surface 104 to the level of the radially inner end of the locking surface. If, in the position represented in FIG. 2, an attempt is made to pivot the section 76 of the freewheel outer element 68 in the clockwise direction while the freewheel inner element 58 is held firmly, the blocking surface 104 abuts the locking section 100 of the pawl 94 so that a further movement in this direction of the freewheel element 68, and therefore of the guide wheel 52, is blocked. In the case of a movement in the opposite direction, the locking section 100 of the pawl slides along the transition region 106 so that there is no blocking effect in this case.

Figures 3, 4:
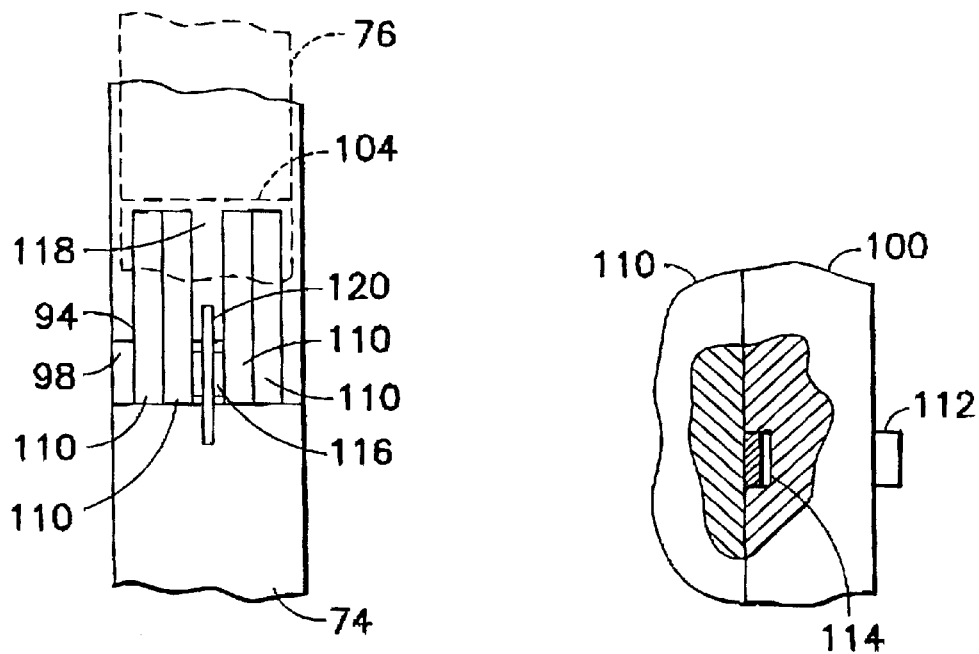
FIG. 3 shows a view, radially from the outside, of a pawl of the free wheel according to the invention.
FIG. 4 shows an enlarged detail which represents the joining together of two pawl plate elements.

As may be seen in FIG. 3, the pawl 94 according to the invention is made up of a plurality of pawl plate elements 110 which have essentially the same profile. The pawl plate elements 110 can be permanently connected together, for example they can be bonded or welded or can be held together by creating formed or stamped regions 112, which engage in respective countersunk regions 114 of a sequential plate element 110. This ensures that the individual pawl plate elements 110 pivot jointly about their pivoting axis S. A pawl plate element 116 between the two internally located pawl plate elements 110 does not essentially protrude radially outward beyond the surface 102. A preloading element 120, for example, spring steel wire, extends through the recess 118 formed in this way. The preloading element 120 is fixed in the circumferential direction on both sides of the depression 98 by fastening sections 122, 124, which engage in corresponding recesses 126, 128 of the section 74. The preloading element 120 extends over a substantially flat peripheral surface of the pawl plate element 116 radially on the outside. The flat surface of the pawl plate element 116 has an interaction edge or an interaction region 130, which is pressed by the preloading force of the preloading element 120 radially inward toward the section 74, so that the locking section 110 is preloaded radially outward for interaction with the blocking surface 104. When the locking section 100 is sliding along the transition region 106 and moving radially inward, the interaction region 130 of the pawl 94 is displaced radially outward, elastically deforming the preloading element 120 at the same time. When traveling over the next blocking surface 104, or the step formed by it, the preloading element 120 springs back into its position shown in FIG. 2 so that the locking section 100 is necessarily moved radially outward and is ready for interaction with the blocking surface 104. The pawl plate element 116 forms a spacer configured with the circular profile of the other pawl plate elements 110 for the joint pivoting or rotation about the pivoting axis S.

By providing the freewheel arrangement 56 with pawls 94 according to the invention, with a plurality of such pawl plate elements 110 which can be manufactured by stamping from sheet metal, a pawl can be obtained with a favorable cost and easily realized design which has a very large width measured in the direction of their pivoting axis S. A relatively large interaction surface for interaction with an opposite or associated blocking surface 104 can be provided so that the surface pressure can be kept small. The result is that the number of pawls can be distinctly reduced relative to the arrangements known from the prior art; in the extreme case, it is even possible to employ one single pawl. This is possible because it is acceptable in the extreme case, in the case of the special employment field in the association with a hydrodynamic torque converter, for the two elements 58, 68 to have to rotate relative to one another by almost 360° in that direction in which a rotation should not per se be permitted before the freewheel arrangement 56 becomes effective. Once this angular range has been traversed, however, the single pawl 94 engages the depression 80 and prevents a further rotation of the guide wheel 52 in this direction while providing a large torque transmission capability. In order, nevertheless, to permit only a reduced free rotational angle in the relative direction of rotation which is per se not permitted, when only a single pawl 94 or a few pawls 94 are employed, it is possible to provide a number of depressions 80 on the section 76 which is larger than the number of pawls 94 provided on the section 74. It is also possible to provide a plurality of such pawls 94 distributed in the circumferential direction. In particular, such a design with a very small number of pawls 94 is suitable when the fluid flow circuit built up between the pump impeller, turbine wheel and guide wheel is displaced relatively far radially toward the outside so that a per se relatively large radial installation space can be provided for the freewheel arrangement 56. The radial extent of the various components, in particular the blocking surface 104 and the associated surface of the locking section 100, can also be configured to be correspondingly larger.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A freewheel arrangement which permits relative rotation of first and second elements essentially in only one relative rotational direction with respect to one another about an axis of rotation, said freewheel arrangement comprising at least one pawl which is pivotably supported on the first element about a pivoting axis, said pawl having a pawl section and comprising a plurality of pawl plate elements, wherein one of said pawl plate elements is a spacer between two other pawl plate elements, said spacer not extending into said pawl section and thereby forming a recess in said pawl section, a blocking surface on the second element, said pawl section being receivable against said blocking surface to prevent relative rotation in the other relative rotational direction, and an elastically deformable preloading element which is fixed to said first element, extends into said recess, and acts on said spacer to preload said pawl into a blocking position.

2. A freewheel arrangement as in claim 1 wherein said pawl plate elements are stacked in the direction of the pivoting axis.

3. A freewheel arrangement as in claim 1 wherein said pawl plate elements are permanently connected together.

4. A freewheel arrangement as in claim 3 wherein said pawl plate elements are connected together by one of bonding, welding, and forming.

5. A freewheel arrangement as in claim 1 wherein said pawl plate elements are stamped from sheet metal.

6. A freewheel arrangement as in claim 1 comprising a maximum of three of said pawls.

7. A freewheel arrangement as in claim 1 comprising only one said pawl.

8. A hydrodynamic torque converter of the type having a freewheel arrangement, said freewheel arrangement comprising a first element which is rotationally fixed, a single pawl which is pivotably supported on the first element about a pivoting axis, said pawl having a pawl section, a second element which is rotatable relative to the first element essentially only in one relative rotational direction, said second element supporting a plurality of guide wheel vanes sequential to one another in a circumferential direction, radially outside of said first and second elements, and a blocking surface on the second element, said pawl section being receivable against said blocking surface to prevent relative rotation in the other relative rotational direction.

9. A hydrodynamic torque converter as in claim 8 wherein said pawl comprises a plurality of pawl plate elements which are stacked in the direction of the pivoting axis.

10. A hydrodynamic torque converter as in claim 9 further comprising a preloading element which preloads said pawl into a blocking position.

11. A hydrodynamic torque converter as in claim 10 wherein one of said pawl plate elements is a spacer between two other pawl plate elements, said spacer not extending into said pawl section and thereby forming a recess in said pawl section, said preloading element being fixed to said first element, extending through said recess, being elastically deformable, and acting on said spacer to preload said pawl into said blocking position.

* * * * *